US012608567B2

(12) United States Patent
Wang et al.

(10) Patent No.: US 12,608,567 B2
(45) Date of Patent: Apr. 21, 2026

(54) METHOD, DEVICE, AND STORAGE MEDIUM FOR TRANSLATING AND DISPLAYING MESSAGES

(71) Applicant: Beijing Zitiao Network Technology Co., Ltd., Beijing (CN)

(72) Inventors: Lingyu Wang, Beijing (CN); Huabin Tian, Beijing (CN); Fengjuan Shi, Beijing (CN); Shengyang Liu, Beijing (CN); Huimin Wu, Beijing (CN); Cheng Jiang, Beijing (CN); Xiao Jia, Beijing (CN); Haoran Li, Beijing (CN); Luobin Li, Beijing (CN); Hesheng Wu, Beijing (CN); Ning Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/866,484

(22) PCT Filed: May 17, 2023

(86) PCT No.: PCT/CN2023/094757
§ 371 (c)(1),
(2) Date: Nov. 15, 2024

(87) PCT Pub. No.: WO2023/226848
PCT Pub. Date: Nov. 30, 2023

(65) Prior Publication Data
US 2025/0322180 A1     Oct. 16, 2025

(30) Foreign Application Priority Data

May 24, 2022   (CN) ......................... 202210571461.9
Jul. 5, 2022   (CN) ......................... 202210784607.8

(51) Int. Cl.
G06F 40/58     (2020.01)
G06F 3/04845     (2022.01)

(52) U.S. Cl.
CPC .......... G06F 40/58 (2020.01); G06F 3/04845 (2013.01)

(58) Field of Classification Search
CPC .............................. G06F 40/40; G06F 3/0481
See application file for complete search history.

(56)     References Cited

U.S. PATENT DOCUMENTS 6,185,591 B1 * 2/2001 Baker ................... G06F 40/166
715/210
2001/0017914 A1   8/2001 Fortman
(Continued)

FOREIGN PATENT DOCUMENTS

CN     102638414 A     8/2012
CN     104516876 A     4/2015
(Continued)

OTHER PUBLICATIONS

Notice of Refusal for Japanese Application No. 2024-565269, mailed May 7, 2025, 4 pages.
(Continued)

*Primary Examiner* — Jialong He
(74) *Attorney, Agent, or Firm* — BakerHostetler

(57)     ABSTRACT

Disclosed in the present application are a message processing method and apparatus, and a device and a medium. The method comprises: when a user uses a translate-while-writing function by means of instant messaging software, in response to inputting a message original text in an input box, displaying, in a translation area, a message translation corresponding to the message original text; after the user triggers a first preset operation of using the translation, displaying the message translation in the input box; and after (Continued)

S201 in response to a message original being input in an input box, displaying a message translation corresponding to the message original in a translation area

S202 in response to a first preset operation of using the translation, displaying the message translation in the input box

S203 in response to a second preset operation of undoing the usage of the translation, displaying the message original in the input box, and displaying the message translation in the translation area the user triggers a second preset operation of revoking the use of the translation, displaying the message original text in the input box.

20 Claims, 8 Drawing Sheets

(56) References Cited

U.S. PATENT DOCUMENTS

| | | | |
|---|---|---|---|
| 2004/0044517 A1 | 3/2004 | Palmquist | |
| 2007/0067152 A1 | 3/2007 | Sembower | |
| 2010/0057433 A1 | 3/2010 | Jackson | |
| 2013/0124185 A1 | 5/2013 | Sarr et al. | |
| 2016/0094495 A1 | 3/2016 | Ahuja et al. | |
| 2016/0267074 A1 | 9/2016 | Nozue | |
| 2016/0349947 A1 | 12/2016 | Xiangli et al. | |
| 2017/0099395 A1 | 4/2017 | Lu | |
| 2019/0104095 A1 | 4/2019 | Yan et al. | |
| 2019/0302897 A1 | 10/2019 | Wespel et al. | |
| 2019/0370340 A1* | 12/2019 | Leydon | G06F 40/58 |
| 2021/0165953 A1 | 6/2021 | Li et al. | |
| 2021/0286956 A1* | 9/2021 | Santo | G06F 40/284 |

FOREIGN PATENT DOCUMENTS

| | | | |
|---|---|---|---|
| CN | 105320651 A | 2/2016 | |
| CN | 107943798 A | 4/2018 | |
| CN | 109582153 A | 4/2019 | |
| CN | 110119514 A | 8/2019 | |
| CN | 110619126 A | 12/2019 | |
| CN | 111241853 A | 6/2020 | |
| CN | 111554280 A | 8/2020 | |
| CN | 111602134 A | 8/2020 | |
| CN | 111859999 A | 10/2020 | |
| CN | 111860000 A | 10/2020 | |
| CN | 112580302 A | 3/2021 | |
| CN | 112799569 A | 5/2021 | |
| CN | 113312928 A | 8/2021 | |
| CN | 114330311 A | 4/2022 | |
| CN | 114841178 A | 8/2022 | |
| CN | 115113787 A | 9/2022 | |
| CN | 114841178 B | 4/2025 | |
| JP | 2003-058457 A | 2/2003 | |
| JP | 2007-148039 A | 6/2007 | |
| JP | 2021190052 A | 12/2021 | |
| KR | 2012-0086037 A | 8/2012 | |
| KR | 2012-0109243 A | 10/2012 | |
| KR | 2016-0063142 A | 6/2016 | |
| WO | 2012/086359 A1 | 6/2012 | |
| WO | WO 2020/198799 A1 | 10/2020 | |

OTHER PUBLICATIONS

China Patent Application No. 202210571461.9; Office Action; dated Jul. 11, 2024; 18 pages.

China Patent Application No. 202210784607.8; Notice of Registration; dated Mar. 27, 2024; 10 pages.

China Patent Application No. 202210784607.8; Office Action; dated Nov. 9, 2023; 14 pages.

International Patent Application No. PCT/CN2023/094757; Int'l Written Opinion and Search Report; dated Jun. 23, 2023; 9 pages.

Tohru Shimzu et al.; "NICT/ATR Chinese-Japanese-English Speech-to-Speech Translation System"; Tsinghua Science and Technology; vol. 13 No. 4; Aug. 2008; p. 540-544.

"How to use the write-and-translate function in the latest version of WeChat?"; https://jingyan.baidu.com/article/ae97a646c203c6fald461dl6. html; Baidu; Aug. 2021; accessed Jan. 24, 2025; 6 pages.

Sun Xujun; "Professional close-fitting translator iFlytek Dual Screen Translator to carry around"; Computer and Network; Nov. 2012; p. 23.

China Patent Application No. 202210571461.9; Notice of Registration; dated Feb. 18, 2025; 10 pages.

"How to turn on the setting and operation method of the automatic translation function of WeChat while writing and translating [Graphic]"; https://zhuanian.zhihu.com/p/467995852; Zhuanlan; accessed Apr. 30, 2025; 20 pages.

* cited by examiner

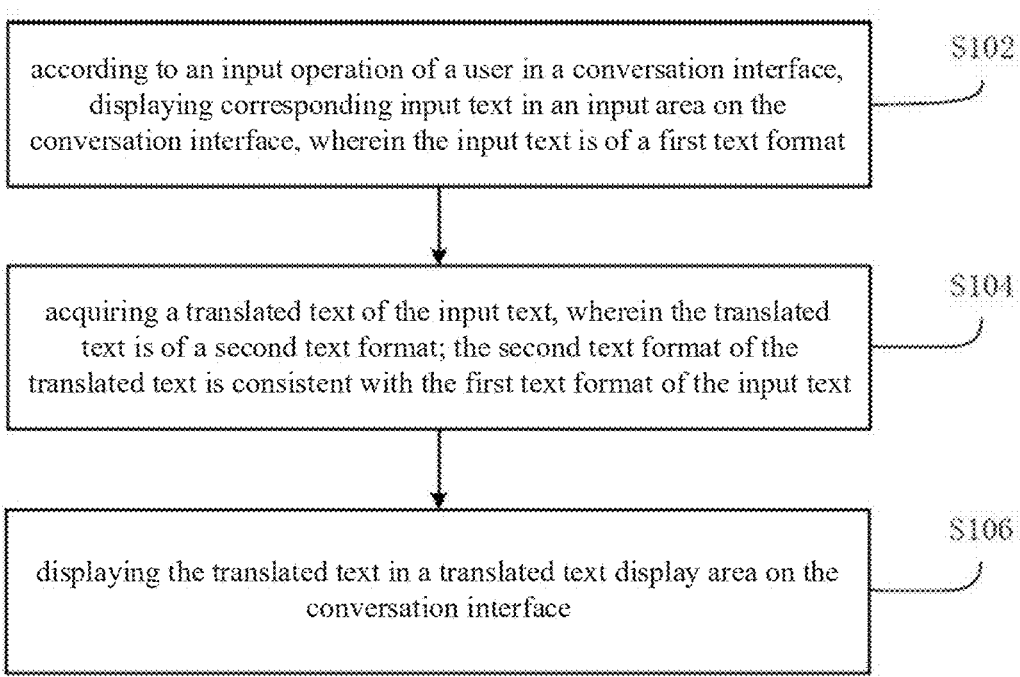

S102 according to an input operation of a user in a conversation interface, displaying corresponding input text in an input area on the conversation interface, wherein the input text is of a first text format

S104 acquiring a translated text of the input text, wherein the translated text is of a second text format; the second text format of the translated text is consistent with the first text format of the input text

S106 displaying the translated text in a translated text display area on the conversation interface

FIG.6

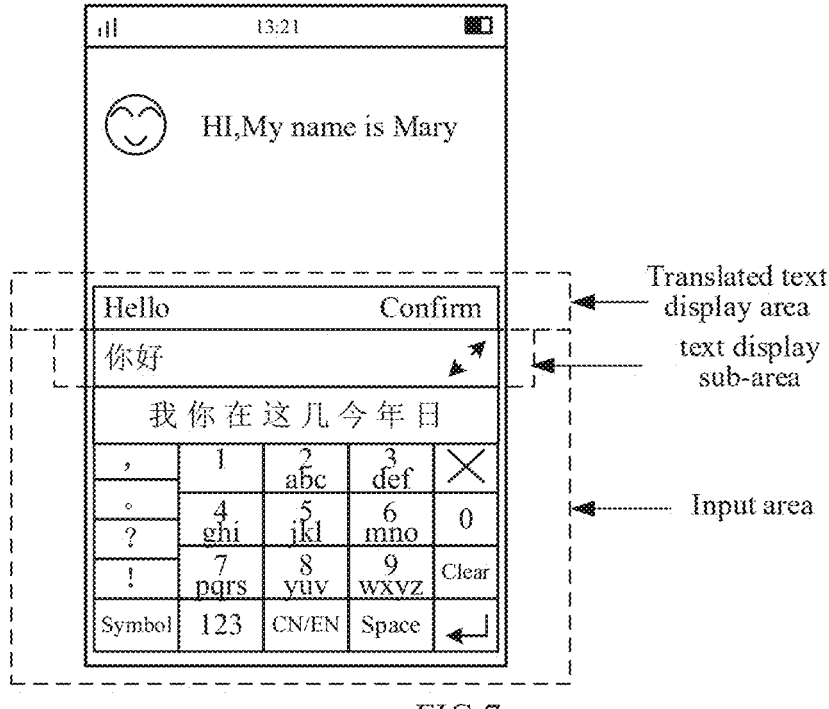

FIG.7a

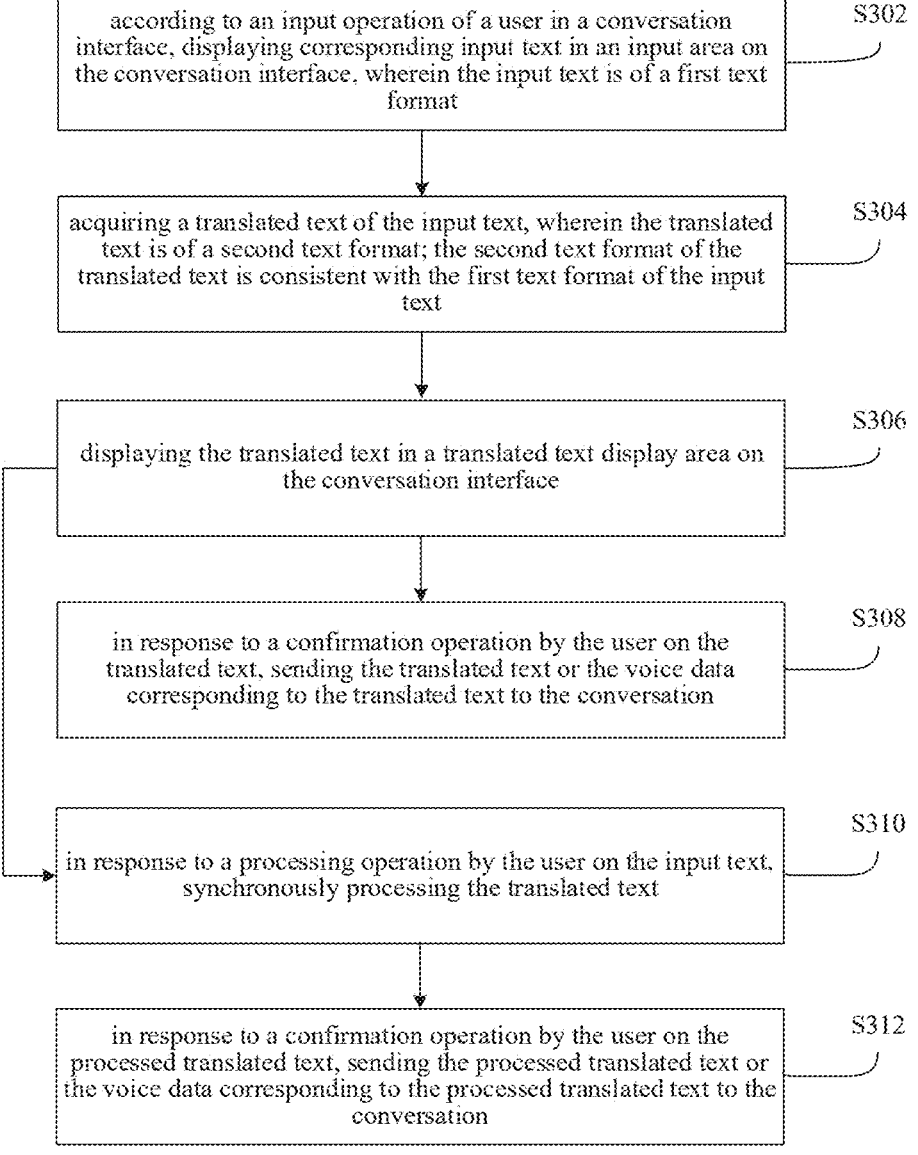

according to an input operation of a user in a conversation interface, displaying corresponding input text in an input area on the conversation interface, wherein the input text is of a first text format — S302 acquiring a translated text of the input text, wherein the translated text is of a second text format; the second text format of the translated text is consistent with the first text format of the input text — S304 displaying the translated text in a translated text display area on the conversation interface — S306 in response to a confirmation operation by the user on the translated text, sending the translated text or the voice data corresponding to the translated text to the conversation — S308 in response to a processing operation by the user on the input text, synchronously processing the translated text — S310 in response to a confirmation operation by the user on the processed translated text, sending the processed translated text or the voice data corresponding to the processed translated text to the conversation — S312

FIG.8

METHOD, DEVICE, AND STORAGE MEDIUM FOR TRANSLATING AND DISPLAYING MESSAGES

CROSS-REFERENCE TO RELATED APPLICATIONS

The present application is a national phase application of PCT/CN2023/094757 filed May 17, 2023, which claims priority to and is based on a Chinese patent application filed to the Chinese Patent Office on May 24, 2022, with application number No. 202210571461.9 and entitled as "Method and apparatus for realizing conversation translation, electronic device and storage medium", and which also claims priority to and is based on a Chinese patent application filed to the Chinese Patent Office on Jul. 5, 2022, with application number No. 202210784607.8 and entitled as "Message processing method and apparatus, device and medium", the aforementioned applications are hereby incorporated by reference in their entireties.

FIELD OF THE INVENTION

The present application relates to the field of computer technology, and in particular to a message processing method, apparatus, device and medium.

BACKGROUND

Currently, in order to improve communication efficiency, users can perform information communication through an instant messaging software. In a global collaboration scenario, cross-language communication is a pain point for many users. Based on this, some instant messaging software supports a translate-while-write function.

DISCLOSURE OF THE INVENTION

In view of this, embodiments of the present application provide a message processing method, apparatus, device and medium, so that in the event of a user's misoperation, the used translation can be undone, thereby improving the user experience.

To achieve the above objectives, the technical solutions provided by the present application are as follows:

In a first aspect of the present application, a message processing method is provided, the method includes:

in response to a message original being input in an input box, displaying a message translation corresponding to the message original in a translation area;

in response to a first preset operation of using the translation, displaying the message translation in the input box; and in response to a second preset operation of undoing the usage of the translation, displaying the message original in the input box.

In a second aspect of the present application, a message processing apparatus is provided, the apparatus includes:

a first display unit configured to, in response to a message original being input in an input box, display a message translation corresponding to the message original in a translation area;

a second display unit configured to, in response to a first preset operation of using the translation, display the message translation in the input box; and a third display unit configured to, in response to a second preset operation of undoing the usage of the translation, display the message original in the input box.

In a third aspect of the present application, an electronic device is provided, the device includes: a processor and a memory;

the memory is used to store instructions or computer programs;

the processor is used to execute the instructions or computer programs in the memory so that the electronic device executes the method described in the first aspect.

In a fourth aspect of the present application, a computer-readable storage medium is provided, wherein instructions are stored in the computer-readable storage medium, when the instructions are executed on a device, the device performs the method described in the first aspect.

In a fifth aspect of the present application, a computer program product is provided, wherein the computer program product includes computer programs/instructions, and the computer programs/instructions, when executed by a processor, cause the method described in the first aspect to be implemented.

It can be seen that the embodiments of the present application have the following advantageous effects:

In embodiments of the present application, when a user uses the translate-while-write function through an instant messaging software, in response to a message original being input in an input box, a message translation corresponding to the message original is displayed in a translation area. When a user triggers a first preset operation of using the translation, the message translation is displayed in the input box. When a user triggers a second preset operation of undoing the usage of the translation, the message original is displayed in the input box. That is, the present application provides an undo function, which allows users to roll back to the previous step through the second preset operation, thereby avoiding the need for users to input again after misoperations, thereby improving the user experience.

In a sixth aspect of the present application, a conversation translation method is provided, including: according to an input operation of a user in a conversation interface, displaying corresponding input text in an input area on the conversation interface, wherein the input text is of a first text format;

acquiring a translated text of the input text, wherein the translated text is of a second text format; the second text format of the translated text is consistent with the first text format of the input text;

displaying the translated text in a translated text display area on the conversation interface.

In a seventh aspect of the present application, a conversation translation apparatus is provided, including:

a first display unit configured to, according to an input operation of a user in a conversation interface, display corresponding input text in an input area on the conversation interface, wherein the input text is of a first text format;

a text acquisition unit configured to acquire a translated text of the input text, wherein the translated text is of a second text format; the second text format of the translated text is consistent with the first text format of the input text;

a second display unit configured to display the translated text in a translated text display area on the conversation interface.

In an eighth aspect of the present application, an electronic device is provided, the device includes:

a processor, and a memory configured to store computer executable instructions; the computer executable instructions, when executed, cause the processor to implement the method described in the sixth aspect.

In a ninth aspect of the present application, a computer-readable storage medium is provided, wherein computer executable instructions are stored in the computer-readable storage medium, wherein the computer executable instructions, when executed by a processor, cause the method described in the first aspect to be implemented.

In a tenth aspect of the present application, a computer program product is provided, wherein the computer program product includes computer programs/instructions, and the computer programs/instructions, when executed by a processor, cause the method described in the sixth aspect to be implemented.

DESCRIPTION OF THE DRAWINGS

In order to more clearly illustrate the technical solutions in the embodiments of the present application or the prior art, the drawings required for describing the embodiments or the prior art will be briefly introduced below. Obviously, the drawings described below are only some embodiments recorded in the present application, and for those ordinary skilled in this field, other drawings can be obtained based on these drawings without paying creative work.

FIG. 6 is a schematic flow chart of a conversation translation method provided in an embodiment of the present specification;

FIG. 7a is a schematic diagram of a scenario of conversation translation provided in an embodiment of the present specification;

FIG. 8 is a schematic flow chart of a conversation translation method provided in another embodiment of the present specification;

DETAILED DESCRIPTION OF PREFERRED EMBODIMENTS

In order to enable those skilled in the art to better understand the scheme of the present application, the technical schemes in embodiments of the present application will be clearly and completely described below in conjunction with the drawings in the embodiments of the present application. Obviously, those described embodiments are only part of the embodiments of the present application, not all of the embodiments.

Based on the embodiments in the present disclosure, all other embodiments obtained by those ordinary skilled in this field without paying any creative work shall fall within the scope of protection of this application.

Figure 1A:
FIG. 1a is a schematic diagram of a conversation-based translate-while-write method provided in an embodiment of the present application.

In some application scenarios, in order to meet the needs of users for cross-language communication, the instant messaging software supports the translate-while-write function. That is, when the user enters a message original in an input box, a translation area will be displayed above the input box, and the message translation will be displayed in the translation area based on the message original input by the user. For example, as shown in FIG. 1a, the client automatically turns on the translate-while-write function of the instant messaging software for the user. A conversation input interface includes an input box 101 and a translation area 102. When the user inputs the original in the input box 101, the corresponding translation will be displayed in the translation area 102. When the user inputs a message in the input box 101, a usage control 103 may be displayed in the translation area, as shown in the upper figure of FIG. 1b, and a shortcut key corresponding to the usage control 103 may also be displayed. When the user triggers the usage control 103 in the translation area, the translation will be displayed in the input box, as shown in the lower figure of FIG. 1b. In response to a sending operation triggered by the user, the translation is sent.

If the user finds that the message needs to be modified before sending the translation, the user needs to manually modify or delete all the contents in the translation and input the message original again for translation, which affects the user's operation. Among them, the translate-while-write means that when the user enters the original in the input box, the corresponding translation of the original can be displayed in the translation area at the same time. The language corresponding to the translation can be set by the user according to his or her own needs.

Based on this, the present disclosure provides a message processing method, when the user inputs the message original through the input box, the message translation corresponding to the message original will be displayed in the translation area. In response to a first preset operation of using the translation, the message translation can be displayed in the input box. When the user needs to roll back, in response to the second preset operation of undoing the usage of the translated text, the message original can be displayed in the input box. That is, when the user makes an input error, the user can roll back through the second preset operation, without needing the user to perform manually editing or inputting again, thereby improving the user experience.

In order to facilitate understanding, the technical solutions provided by the embodiments of the present application will be described below with reference to the accompanying drawings.

Figure 2:
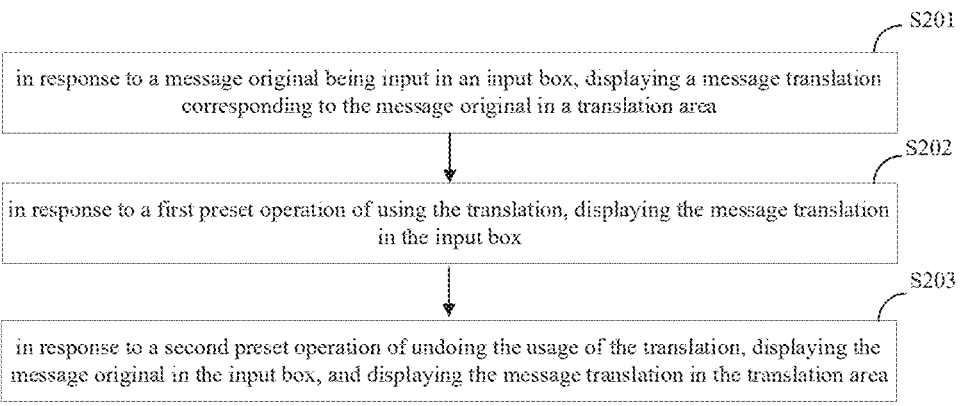
FIG. 2 is a schematic flow chart of a message processing method provided in an embodiment of the present application.

Referring to FIG. 2, which is a message processing method provided in an embodiment of the present application, the method can be executed by a message processing client which can be installed in an electronic device. Among them, the electronic device may include a device with communication functions, such as mobile phone, tablet computer, laptop, desktop computer, vehicle-mounted terminal, wearable electronic device, all-in-one machine, smart home device and so on, other, or may also be a device simulated by virtual machines or simulators. As shown in FIG. 2, the method may include the following steps:

S201: in response to a message original being input in an input box, displaying a message translation corresponding to the message original in a translation area.

In the embodiment, when the user enables the translate-while-write function and inputs the message original in the input box, the message translation corresponding to the message original can be displayed in the translation area. Among them, the translation area may be located above the input box and adjacent to the input box to facilitate user browsing, as shown in FIG. 1*a*.

Figure 1B:
FIG. 1b is a schematic diagram of an input interface provided in an embodiment of the present application.

In an embodiment of the present disclosure, when the message translation corresponding to the message original is displayed in the translation area, a first control may also be displayed in the input interface. Among them, the first control is used to trigger the usage of message translation, the input interface may include a translation area and an input box area, and the first control can be displayed in the translation area, the input box area, or any location in the input interface other than the translation area and the input box area. For example, the first control is the usage control 103 located in the translation area as shown in FIG. 1*b*, so that the user can intuitively know the function of the first control.

Specifically, when the translate-while-write function is turned on, a translation area may be displayed above the input box, as shown in the schematic diagram of FIG. 1*a*. Alternatively, when the user turns on the translate-while-write function, but the user has not yet input a message in the input box, a translation area may be displayed above the input box and a third control may be displayed in the translation area, and the third control is used to close the translation area. As shown in the schematic diagram of the translation area in FIG. 3*a*, the third control 104 is displayed in the translation area. After the user inputs the message original in the input box, the translation area may display the message translation and the first control 103, and the third control is no longer displayed, such as that in the schematic diagram of FIG. 1*b*.

The translate-while-write function may be turned on manually by the user, or turned on automatically by the client. For example, when main languages of the two parties in the conversation are inconsistent and the main language of the current user is not English, when the current user enters the conversation, input translation can be automatically enabled for the user. Among them, the translate-while-write function can support translation of different types of messages, such as text, rich text, and messages including a @ identifier.

S202: in response to a first preset operation of using the translation, displaying the message translation in the input box.

In the present embodiment, when the user triggers the first preset operation of using the translation, indicating the usage of the message translation in the translation area, the message translation can be displayed in the input box, thereby realizing the usage of the message translation. Among them, the first preset operation may be a trigger operation on the first control, or a trigger operation on a shortcut key for usage of translation, or an operation of right-clicking to invoke a menu option and clicking on a usage-of-translation option in the menu option.

In an embodiment of the present disclosure, when the message translation is displayed in the input box, a second control may also be displayed in the input interface. Among them, the second control can be used to undo the usage of the message translation, and the second control can be displayed in the translation area, the input box area, or any location in the input interface other than the translation area and the input box area. For example, in the scenario application shown in FIG. 3*b*, when the user triggers the usage control 103, the message translation appears in the input box, an undo control 105 can be displayed in the translation area, and the usage control 103 is no longer displayed.

S203: in response to a second preset operation of undoing the usage of the translation, displaying the message original in the input box.

When the user wants to undo the current usage, a second preset operation of undoing the usage of the translation may be triggered. In response to receiving the second preset operation triggered by the user, the message original can be controlled to reappear in the input box. That is, the usage of the message translation can be undone through the second preset operation, which is convenient for the user to quickly roll back to the previous step and re-edit the message original, thereby improving the user experience. For example, in the scenario application shown in FIG. 3*c*, when the user triggers the undo control 105, the message translation appears in the translation area, the message original appears in the input box, and after the usage control 103 is displayed in the translation area, the undo control 105 is no longer displayed.

In addition, after the message original is displayed in the input box, the message translation can also be displayed in the translation area, so that the user can view the translation corresponding to the message original.

Among them, when the first control is displayed in the input interface, a shortcut key corresponding to the first control may also be displayed, so that the user can trigger the usage of the translation through the shortcut key. It should be noted that when the second control or the third control is displayed in the input interface, their corresponding shortcut keys may also be displayed, which is not limited in this embodiment.

Among them, when the second control is displayed in the input interface, the second preset operation of undoing the usage of the translation is a triggering operation on the second control. Alternatively, the second preset operation may be a triggering operation on a shortcut key for undoing the usage of the translation, or an operation of right-clicking to invoke a menu option and clicking an undo usage-of-translation option in the menu option.

In an embodiment of the present disclosure, after the usage of translation is undone, when the message original is displayed in the input box, the first control can be redisplayed in the input interface, so that the user can reuse the translation by triggering the first control, which is convenient for user operation.

Figures 3A, 3B, 3C, 3D:
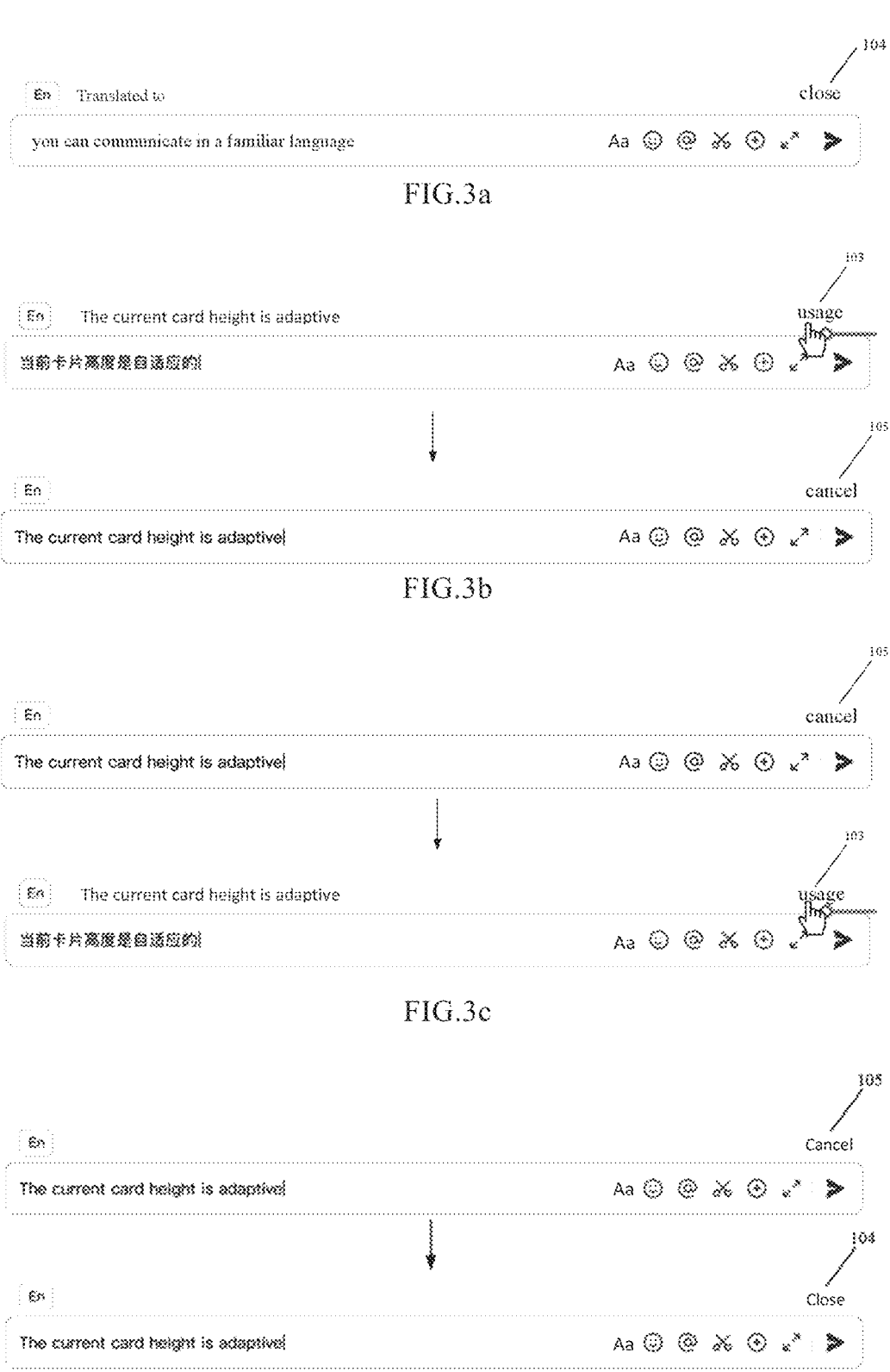
FIG. 3a to FIG. 3d are schematic diagrams showing a translation area provided in an embodiment of the present application.

In an embodiment of the present disclosure, a display duration of the second control can also be set, and during the display duration, the user can roll back to the previous step through the second control, when the display duration is exceeded, the third control can be displayed in the input interface while the second control is no longer displayed. Specifically, if the input box displays the message translation, the second control is displayed in the input interface, and there is no input within a preset duration, the third control is displayed in the input interface and the second control is not displayed. For example, if the display duration is 30 seconds, when the message translation appears in the input box and the user does not input anything in the input box for more than 30 seconds, the second control is no long displayed while the third control is displayed. Among them, the third control can be displayed in the translation area, the input box area, or any location in the input interface other than the translation area and the input box area. For example, as shown in FIG. 3d, when the display duration of the undo control 105 is equal to the preset duration and there is no input operation in the input box, in the translation area, the undo control 105 changes to the close control 104 (third control).

In an embodiment of the present disclosure, if a message translation is displayed in the input box and a second control is displayed in the input interface, in response to triggering the sending of the message translation, a third control is displayed in the input interface and the second control is not displayed. That is, when the user triggers sending of the used message translation, the control displayed in the input interface changes from the second control to the third control, and the third control is used to close the translation area. For example, in the structural diagram shown in FIG. 3a showing the translation area, a close control 104 can be displayed in the translation area.

In an embodiment of the present disclosure, in response to the user continuing to trigger an input operation in the input box, a first control is displayed in the input interface. When the user continues to input in the input box, if the input box includes existing message translation, then the existing message translation and the message translation corresponding to the message original that the user continues to input can be displayed in the translation area. Among them, before the user continues to trigger an input operation in the input box, the control displayed in the input interface may be the second control or the third control. That is, when the user continues to trigger the input operation in the input box, the control in the input interface can change from an undo control to a usage control, or from a close control to a usage control, so that the user can continue to input the message original in the input box at any time, without needing manual switching, thereby improving the user experience.

Specifically, if the message translation is displayed in the input box and the second control is displayed in the input interface, in response to the user continuing to input in the input box, the first control is displayed in the input interface and the second control is not displayed. That is, based on the user continuing to input the message original in the input box, it can be automatically triggered that the control displayed in the input interface changes from the second control to the first control.

Among them, the message translation may include multimedia resources, which include one or more of pictures, videos or links (non-naked links). Among them, naked links refer to kinds of external links that cannot be directly clicked by users to enter a target page.

In an embodiment of the present disclosure, the method may further include: in response to an operation of sending a message translation, sending the message translation to a conversation; in response to re-editing triggered for the sent message translation, displaying all contents in the message translation in the input box. That is, when the user performs re-editing, contents in the message translation of all formats, such as texts, pictures or links, can reappear in the input box, compared with the current case where only the texts in the message translation reappear in the input box, it is convenient for users to edit and thereby improving the user experience. Among them, the re-editing operation triggered by the user on the sent message translation may include first triggering an undo operation on the sent message translation, and then triggering a re-editing operation on the undone message translation.

It can be seen that when a user uses the translate-while-write function through an instant messaging software, in response to a message original being input in an input box, a message translation corresponding to the message original is displayed in a translation area. When a user triggers a first preset operation of using the translation, the message translation is displayed in the input box. When a user triggers a second preset operation of undoing the usage of the translation, the message original is displayed in the input box. That is, the users can roll back to the previous step through the second preset operation, thereby avoiding the need for users to input again even misoperation, thereby improving the user experience.

Based on the above method embodiments, an embodiment of the present application provides a message processing apparatus and device, which will be described below in conjunction with the accompanying drawings.

Figure 4:
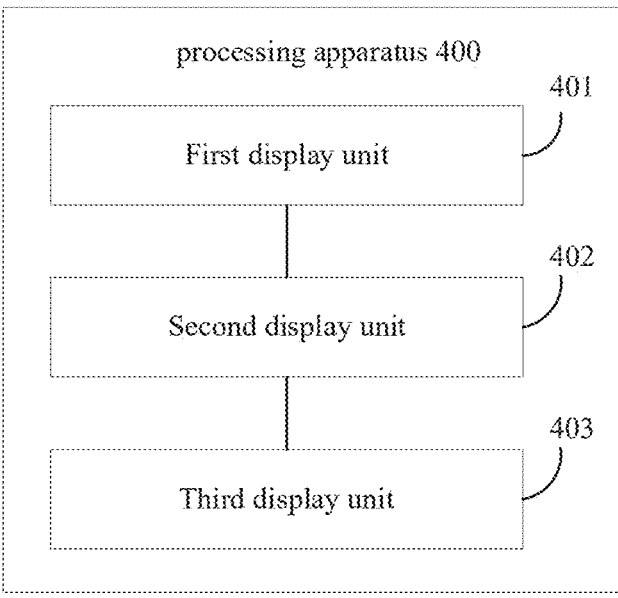
FIG. 4 is a schematic diagram of a message processing apparatus provided in an embodiment of the present application.

Referring to FIG. 4, which is a schematic structural diagram of a message processing apparatus provided in an embodiment of the present application. As shown in FIG. 4, the apparatus 400 may include: a first display unit 401, a second display unit 402, and a third display unit 403.

The first display unit 401 is configured to, in response to a message original being input in an input box, display a message translation corresponding to the message original in a translation area;

The second display unit 402 is configured to, in response to a first preset operation of using the translation, display the message translation in the input box; and The third display unit 403 is configured to, in response to a second preset operation of undoing the usage of the translation, display the message original in the input box.

In an embodiment of the present disclosure, the third display unit 403 is further configured to display the message translation in the translation area.

In an embodiment of the present disclosure, the first display unit 401 is further configured to display a first control in the input interface, when the message translation corresponding to the message original is displayed in the translation area; the first preset operation of using the translation serves as a triggering operation for the first control;

The second display unit 402 is further configured to display the second control in the input interface when the message translation is displayed in the input box; the second preset operation of undoing the usage of the translation serves as a triggering operation for the second control;

The third display unit 403 is further configured to, in response to the second preset operation of undoing the usage of the translation, display the first control in the input interface when the message translation is displayed in the input box.

In an embodiment of the present disclosure, the apparatus may further include: a control unit;

The control unit is configured to, if the input box displays the message translation and the second control is displayed in the input interface, in response to continuing to input in the input box, display the first control and not display the second control in the input interface.

In an embodiment of the present disclosure, the apparatus may further include: a fourth display unit;

The fourth display unit is configured to, if the input box displays the message translation and the second control is displayed in the input interface, in response to triggering to send the message translation, display a third control and not display the second control in the input interface, wherein the third control is used to close the translation area.

In an embodiment of the present disclosure, the device further includes: a fourth display unit;

The fourth display unit is configured to, if the input box displays the message translation, the second control is displayed in the input interface, and there is no input within a preset duration, display a third control and not display the second control in the input interface, wherein the third control is used to close the translation area.

In an embodiment of the present disclosure, the fourth display unit is further configured to display the first control in the input interface, if the input operation is continuously triggered in the input box.

In an embodiment of the present disclosure, one or more of the following is included: displaying the first control in the translation area; displaying the second control in the translation area; and displaying the second control in the translation area.

In an embodiment of the present disclosure, the message translation includes multimedia resources, and the multimedia resources include one or more of pictures, videos or links.

In an embodiment of the present disclosure, the apparatus further includes: a sending unit and a fifth display unit;

The sending unit is configured to, in response to an operation of sending the message translation, send the message translation to a conversation;

The fifth display unit is configured to display all contents of the message translation in the input box in response to re-editing triggered for the sent message translation.

It should be noted that specific implementation of each unit in the embodiments can refer to relevant descriptions in the above method embodiments.

The division of units in the embodiments of the present application is schematic and merely belongs to a kind of logical function division. There may be other division manners in actual implementation. The functional units in the embodiments of the present application may be integrated into one processing unit, or each unit may exist physically separately, or two or more units may be integrated into one unit. For example, in the above embodiments, the processing unit and the sending unit may be the same unit or different units. The above integrated units can be implemented in the form of hardware or in the form of software functional unit.

Hereinafter specifically referring to FIG. 5, which illustrates the schematic structural diagram applicable to implement electronic device 500 in the embodiments of the present disclosure. The terminal devices 500 in the embodiments of the present disclosure may include, but not limited to, mobile terminals such as mobile phones, notebook computers, digital broadcast receivers, PDAs (personal digital assistants), PAD (tablet computers), PMP (portable multimedia players), vehicle-mounted terminals (for example, vehicle-mounted navigation terminals), etc., and fixed terminals such as digital TVs, desktop computers, and the like. The electronic device shown in FIG. 5 is only an example, and should not impose any restriction on the functions and application scopes of the embodiments of the present disclosure.

Figure 5:
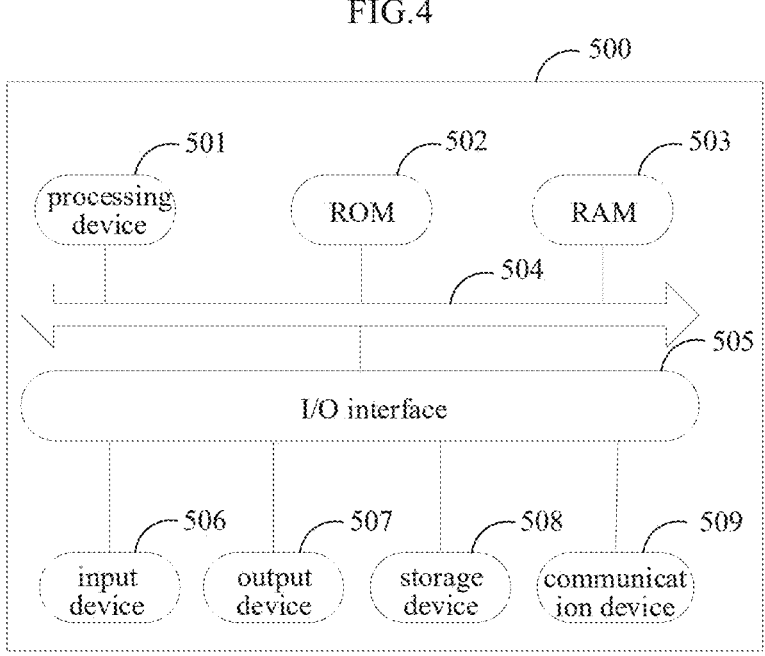
FIG. 5 is a schematic structural diagram of an electronic device provided in an embodiment of the present application.

As shown in FIG. 5, the electronic device 500 can include a processing apparatus (such as a central processing unit, a graphics processor, etc.) 501, which can perform various appropriate actions and processes according to a program stored in a Read Only Memory (ROM) 502 or a program loaded into a Random Access Memory (RAM) 503 from a storage device 508 to implement the search interface presentation method according to embodiments of the present disclosure. In the RAM 503, various programs and data required for the operation of the electronic device 500 are also stored. The processing device 501, ROM 502 and RAM 503 are connected to each other through a bus 504. An input/output (I/O) interface 505 is also connected to the bus 504.

Generally, the following devices can be connected to the I/O interface 505: an input device 506 including, for example, touch screen, touch pad, keyboard, mouse, camera, microphone, accelerometer, gyroscope, etc.; an output device 507 such as Liquid Crystal Display (LCD), speakers, vibrators, etc.; a storage device 508 including a magnetic tape, a hard disk, etc.; and a communication device 509. The communication device 509 may allow the electronic device 500 to communicate with other devices wirelessly or in wired so as to exchange data. Although an electronic device 500 with various devices is shown in FIG. 5, it should be understood that it is not required to implement or have all the devices shown. More or fewer devices may alternatively be implemented or provided.

Particularly, according to embodiments of the present disclosure, the process described above with reference to the flowchart can be implemented as a computer software program. For example, an embodiment of the present disclosure includes a computer program product including a computer program carried on a computer readable medium, the computer program containing program code for executing the method shown in the flowchart. In such an embodiment, the computer program can be downloaded and installed from the network through the communication device 509, or installed from the storage device 508 or from the ROM 502. When executed by the processing device 501, the computer program carries out the above-mentioned functions defined in the method of the embodiment of the present disclosure.

The electronic device provided by the embodiment of the present disclosure and the method provided by the above embodiments belong to the same inventive concept, the technical details not fully described in the embodiment can be referred to the above embodiments, and the embodiment achieves the same beneficial effects as the above embodiment.

The embodiments of the present disclosure provide a computer storage medium on which a computer program is stored, the program, when executed by a processor, causes the method provided by the above embodiments to be implemented.

It should be noted that the above-mentioned computer-readable medium in this disclosure can be a computer-readable signal medium or a computer-readable storage medium or any combination of the two. The computer-readable storage medium can be, for example, but not limited to, an electrical, magnetic, optical, electromagnetic, infrared, or semiconductor system, device or equipment, or any combination of the above. More specific examples of computer-readable storage media may include, but not limited to, an electrical connection with one or more wires, a portable computer diskette, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, the computer-readable storage medium can be any tangible medium that contains or stores a program that can be used by or in combination with an instruction execution system, device, or equipment. In this disclosure, the computer-readable signal medium may include a data signal propagated in baseband or as a part of a carrier wave, in which computer-readable program codes are carried. This propagated data signal can take many forms, including, but not limited to, electromagnetic signals, optical signals, or any suitable combination of the above. The computer-readable signal medium can also be any computer-readable medium other than the computer-readable storage medium, which can send, propagate, or transmit the program for use by or in connection with the instruction execution system, apparatus, or device. The program codes contained in the computer-readable medium can be transmitted by any suitable medium, including but not limited to: electric wire, optical cable, RF (radio frequency), etc., or any suitable combination of the above.

In some embodiments, the client and the server can communicate by using any currently known or future developed network protocol such as HTTP (HyperText Transfer Protocol), and can be interconnected with any form or medium of digital data communication (e.g., communication network). Examples of communication networks include a local area network ("LAN"), a wide area network ("WAN"), an internet network (e.g., the Internet) and end-to-end network (e.g., ad hoc end-to-end network), as well as any currently known or future developed networks.

The above-mentioned computer-readable medium may be included in the electronic device; or it can exist alone without being loaded into the electronic device.

The above-mentioned computer-readable medium carries one or more programs, which, when executed by a terminal device, cause the terminal device to implement the above-mentioned methods.

Computer program codes for performing the operations of the present disclosure can be written in one or more programming languages or a combination thereof, including object-oriented programming languages such as Java, Smalltalk, and C++, as well as conventional procedural programming languages such as "C" language or similar programming languages. The program codes can be completely executed on the user's computer, partially executed on the user's computer, executed as an independent software package, partially executed on the user's computer and partially executed on the remote computer, or completely executed on the remote computer or server. In a case related to remote computers, the remote computers can be connected to the user computers through any kind of networks, including Local Area Network (LAN) or Wide Area Network (WAN), or can be connected to external computers (for example, through the Internet with Internet service providers).

The flowcharts and block diagrams in the drawings illustrate the architecture, functions, and operations of possible embodiments of systems, methods, and computer program products according to various embodiments of the present disclosure. In this regard, each block in the flowchart or block diagram may represent a module, a program segment, or a part of the code, which contains one or more executable instructions for implementing specified logical functions. It should also be noted that in some alternative implementations, the functions labeled in the blocks may also occur in a different order than those labeled in the drawings. For example, two blocks shown in succession can actually be executed substantially in parallel, and sometimes they can be executed in the reverse order, depending on the functions involved. It should also be noted that each block in the block diagram and/or flowchart, and the combination of blocks in the block diagram and/or flowchart, can be realized by a dedicated hardware-based system that performs specified functions or operations, or can be implemented by a combination of dedicated hardware and computer instructions.

The units described in the embodiments of this disclosure can be realized by software or hardware. In some cases, the name of the unit does not limit the module itself.

The functions described above herein can be at least partially performed by one or more hardware logic components. For example, without limitation, exemplary types of hardware logic components that can be used may include: field programmable gate array (FPGA), application specific integrated circuit (ASIC), application specific standard product (ASSP), system on chip (SOC), complex programmable logic device (CPLD) and so on.

In the context of the present disclosure, a machine-readable medium can be a tangible medium that can contain or store a program for use by or in connection with an instruction execution system, apparatus, or device. The machine-readable medium can be a machine-readable signal medium or a machine-readable storage medium. The machine-readable medium may include, but not limited to, electronic, magnetic, optical, electromagnetic, infrared, or semiconductor systems, devices or equipment, or any suitable combination of the foregoing. More specific examples of machine-readable storage medium may include electrical connections based on one or more wires, portable computer disks, hard disks, random access memories (RAM), read-only memories (ROM), erasable programmable read-only memories (EPROM or flash memories), optical fibers, compact disk read-only memories (CD-ROMs), optical storage devices, magnetic storage devices, or any suitable combination of the above.

It should be noted that the various embodiments in the present specification are described in a progressive manner, and each embodiment focuses on the differences from other embodiments. The same or similar parts between the various embodiments can be referenced to each other. As for the system or apparatus disclosed in the embodiments, since they correspond to the methods disclosed in the embodiments, their descriptions are relatively simple, and the relevant parts can be referred to the description of the method part.

It should be understood that, in the present application, "at least one (item)" means one or more, and "a plurality of" means two or more. "And/or" is used to describe the association relationship of associated objects, indicating there may exist three relationships. For example, "A and/or B" can mean: only A exists, only B exists, and A and B exist at the same time, where A and B can be singular or plural. The character "/" generally indicates that the previous and next associated objects are in an "or" relationship. "At least one of the following items" or similar expressions can refer to any combination of these items, including single items or any combination of plural items. For example, at least one of a, b or c can represent: a, b, c, "a and b", "a and c", "b and c", or "a and b and c", where a, b, c can be single or plural.

It should also be noted that, in this document, relational terms such as "first" and "second", etc. are merely used to distinguish one entity or operation from another entity or operation, and do not necessarily require or imply any actual relationship or order between these entities or operations. Furthermore, the terms "include", "comprise", or any other variations thereof are intended to cover non-exclusive inclusion, such that a process, method, article, or apparatus that includes a list of elements includes not only those elements but also other elements not expressly listed, or also includes elements inherent to such process, method, article, or apparatus. Without more constraints, an element defined by the phrase "comprising a . . . " does not exclude the existence of other identical elements in the process, method, article or apparatus comprising the element.

The steps of the methods or algorithms described in conjunction with the embodiments disclosed herein may be implemented directly using hardware, a software module executed by a processor, or a combination of them.

The software module may be placed in random access memory (RAM), memory, read-only memory (ROM), electrically programmable ROM, electrically erasable programmable ROM, registers, hard disk, removable disk, CD-ROM, or any other form of storage medium known in the technical field.

The above description of the disclosed embodiments enables those skilled in the art to implement or use the present application. Various modifications to these embodiments will be readily apparent to those skilled in the art, and the general principles defined herein may be implemented in other embodiments without departing from the spirit or scope of the present application. Thus, the present application will not be limited to the embodiments shown herein but will be accorded the widest scope consistent with the principles and novel features disclosed herein.

Furthermore, with rapid development of global collaborative office scenarios, more and more employees within large multinational companies are collaborating through the collaborative office software, these employees are usually distributed in different countries and regions and speak different languages. Most collaborative office software integrates multiple office applications such as instant messaging, cloud documents, audio and video conferencing, etc., which greatly improves the collaborative office efficiency among employees of multinational companies in different countries/regions.

In a cross-language collaborative office scenario, when employees from different countries/regions collaborate through the collaborative office software, they may be subject to language barriers, which reduces communication efficiency and office efficiency. For example, when employee A who speaks language X communicates with employee B who speaks language Y through the collaborative office software, since each of A and B is not familiar with the other's language, A needs to translate the content to be communicated from language X to language Y through a translation software and then sends it to B, such additional translation processing operation reduces the communication efficiency between A and B, and thus reduces office efficiency.

Based on this, it is necessary to provide a technical solution to improve the communication efficiency between users in cross-language communication scenarios, and improve the collaborative office efficiency of users.

FIG. 6 is a schematic flow chart of a conversation translation method provided in an embodiment of the present specification. As shown in FIG. 6, the flow includes the following steps:

Step S102, according to an input operation of a user in a conversation interface, displaying corresponding input text in an input area on the conversation interface, wherein the input text is of a first text format;

Step S104, acquiring a translated text of the input text, wherein the translated text is of a second text format; the second text format of the translated text is consistent with the first text format of the input text;

Step S106, displaying the translated text in a translated text display area on the conversation interface.

In an embodiment of the present specification, according to an input operation of a user in a conversation interface, displaying corresponding input text in an input area on the conversation interface, wherein the input text is of a first text format; acquiring a translated text of the input text, wherein the translated text is of a second text format; the second text format of the translated text is consistent with the first text format of the input text; displaying the translated text in a translated text display area on the conversation interface.

It can be seen that in the embodiments, the input text from the user in the conversation can be translated in real time to obtain the translated text, and the text format of the translated text can be kept consistent with that of the input text, with the help of the format synchronization between the translated text and the input text, the user's expression intention can be better retained in the translated text, thereby improving the communication efficiency between users in cross-language communication scenarios and improving the users' collaborative office efficiency.

In an embodiment of the present disclosure, the conversation is a conversation in an instant messaging application integrated with the collaborative office software, in the above step S102, according to an input operation of a user in a conversation interface in the instant messaging application integrated with the collaborative office software, corresponding input text can be displayed in an input area on the conversation interface.

In other embodiments, the conversation may also be a conversation in other scenarios, such as a conversation in an independent instant messaging application, a conversation in a video or audio conference, a conversation for communication between different users in various platform applications (such as e-commerce platforms, video platforms, social platforms), etc. Among them, for e-commerce platforms, communications between different sellers, communications between different buyers, communications between sellers and buyers, communications between buyers and platform customer service staff, and communications between sellers and platform customer service staff each can be implemented through conversations, for video platforms, communications between different video bloggers, and communications between video bloggers and platform customer service staff each can be implemented through conversations, for social platforms, communications between different platform users, and communications between platform users and platform customer service staff each can be implemented through conversations. Furthermore, the conversation may be a conversation entered when a user sends a text message or a multimedia message through a mobile phone base station. Therefore, in step S102, according to the input operation of the user in the conversation interface of any conversation, the corresponding input text may be displayed in the input area on the conversation interface. The input text may be of a first text format.

In an embodiment, in the above step S102, according to the input operation of the user in the conversation interface, the corresponding input text can be displayed in the input area on the conversation interface, specifically:

(a1) according to the text input operation of the user in the conversation interface, acquiring the user's input text and displaying the input text in the input area on the conversation interface;

Alternatively, (a2) according to an audio input operation of the user in the conversation interface, acquiring audio data input by the user, performing text conversion for the audio data to obtain input text, and displaying the input text in the input area on the conversation interface.

In one case, the user may input text in the conversation interface, then, according to the text input operation of the user in the conversation interface, the user's input text can be obtained and displayed in the input area on the conversation interface. In such a case, the first text format is a text format customized for the input text when the user edits the input text, and the user can perform an input operation to input text through a rich text input box or a plain text input box provided by the conversation.

In another case, the user may input audio data in the conversation interface, then the audio data input by the user can be obtained, the audio data can be subject to text conversion to obtain input text, and the input text is displayed in the input area on the conversation interface. In such a case, the user can perform input operations through a voice input control provided by the conversation to input audio data.

In a case where the user inputs audio data, considering that the audio data does not have a text format, in an embodiment, after the audio data has been subject to text conversion to obtain input text, the first text format of the converted input text can be set to a default format of the conversation, or a format pre-configured by the user in the conversation, or, after the converted input text is obtained, the user can adjust the format of the input text based on a format setting tool in the conversation interface.

Among them, when the first text format is a format pre-configured by the user in the conversation, an interface of a user-defined format may also be provided, through which the user-defined format can be obtained, and the user-defined format can be set as the first text format corresponding to the voice input situation.

It can be seen that in this embodiment, taking into account the situation that the audio data does not have a text format, after the audio data input by the user has been subject to text conversion to obtain input text, the first text format of the converted input text can be set to the default format of the conversation, or the format pre-configured by the user in the conversation, therefore, when the user inputs audio data, it is possible to set the corresponding first text format for the input text corresponding to the audio data.

FIG. 7a is a schematic diagram of a scenario of conversation translation provided in an embodiment of the present specification, as shown in FIG. 7a, in one scenario, taking a collaborative office software on a mobile phone as an example, the user can input a conversation message in text form through a plain text input box in an instant messaging application integrated with the collaborative office software, and when the user inputs the conversation message in text form, the instant messaging application can translate the conversation message in text form input by the user into a language used by a conversation partner in real time, to obtain the translated text, and set a second text format of the translated text to be the same as the first text format of the user's input text, and display the translated text in the translated text display area. In the figure, taking the language used by a conversation partner being English as an example for illustration.

Figure 7B:
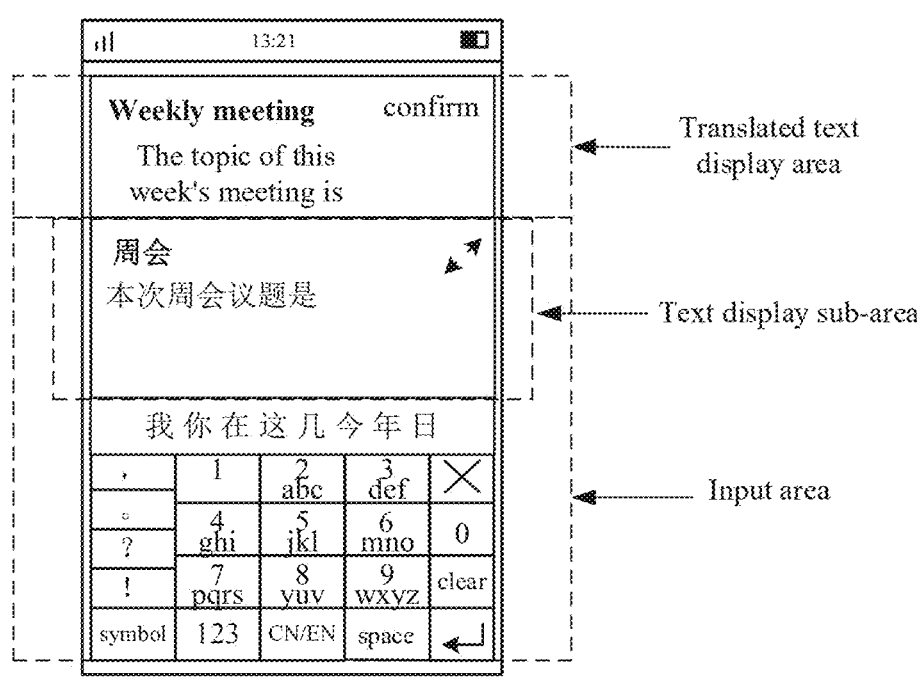
FIG. 7b is a schematic diagram of a scenario of conversation translation provided in another embodiment of the present specification.

FIG. 7b is a schematic diagram of a scenario of conversation translation provided in another embodiment of the present specification, as shown in FIG. 7b, in one scenario, taking a collaborative office software on a mobile phone as an example, the user can input a conversation message in text form through a rich text input box in an instant messaging application integrated with the collaborative office software, and when the user inputs the conversation message in text form, the instant messaging application can translate the conversation message in text form input by the user into a language used by a conversation partner in real time, to obtain the translated text, and set a second text format of the translated text to be the same as the first text format of the user's input text, and display the translated text in the translated text display area. In the figure, taking the language used by a conversation partner being English as an example for illustration.

Figure 7C:
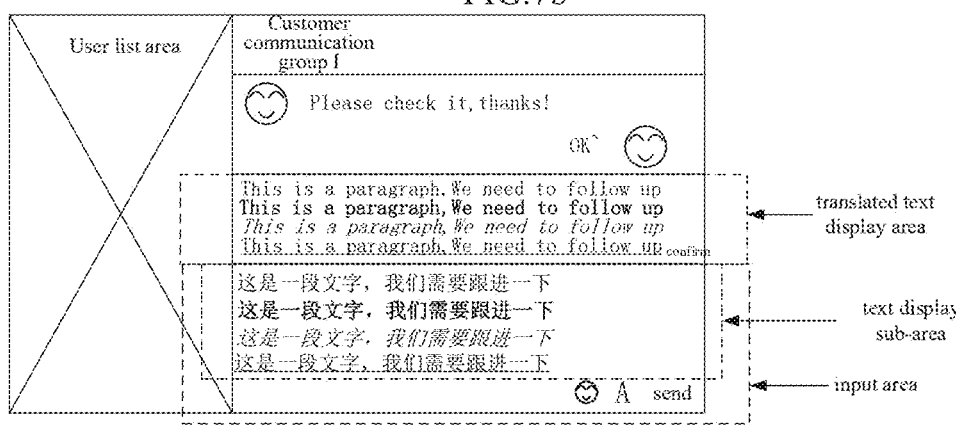
FIG. 7c is a schematic diagram of a scenario of conversation translation provided in another embodiment of the present specification.

FIG. 7c is a schematic diagram of a scenario of conversation translation provided in another embodiment of the present specification, as shown in FIG. 7c, in one scenario, taking a collaborative office software on a computer as an example, the user can input a conversation message in text form through a plain text input box in an instant messaging application integrated with the collaborative office software, and when the user inputs the conversation message in text form, the instant messaging application can translate the conversation message in text form input by the user into a language used by a conversation partner in real time, to obtain the translated text, and set a second text format of the translated text to be the same as the first text format of the user's input text, and display the translated text in the translated text display area. In the figure, taking the language used by a conversation partner being English as an example for illustration.

Figure 7D:
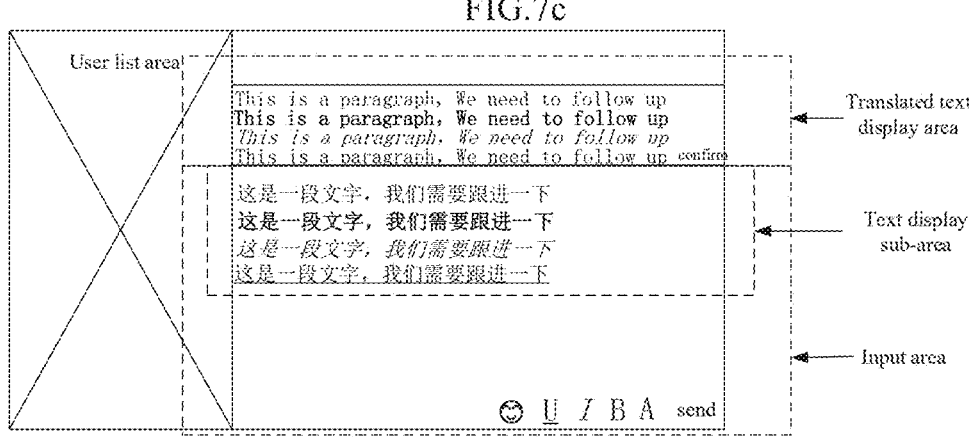
FIG. 7d is a schematic diagram of a scenario of conversation translation provided in another embodiment of the present specification.

FIG. 7d is a schematic diagram of a scenario of conversation translation provided in another embodiment of the present specification, as shown in FIG. 7d, in one scenario, taking a collaborative office software on a computer as an example, the user can input a conversation message in text form through a rich text input box in an instant messaging application integrated with the collaborative office software, and when the user inputs the conversation message in text form, the instant messaging application can translate the conversation message in text form input by the user into a language used by a conversation partner in real time, to obtain the translated text, and set a second text format of the translated text to be the same as the first text format of the user's input text, and display the translated text in the translated text display area. In the figure, taking the language used by a conversation partner being English as an example for illustration.

Here is a brief explanation, a plain text input box and a rich text data box differs in that the plain text input box cannot be input an image, and cannot perform more complex formatting, such as numbering, etc., on text. The rich text data box can be inserted a picture and can perform more complex formatting on the text to meet format requirements such as numbering, wrapping, etc. . . . The rich text input box is equivalent to a small wordpad application.

Of course, in both the plain text input box and the rich text input box, the user can perform simple formatting, such as bold, italic, font, font size, etc., on the input conversation message.

Figure 7E:
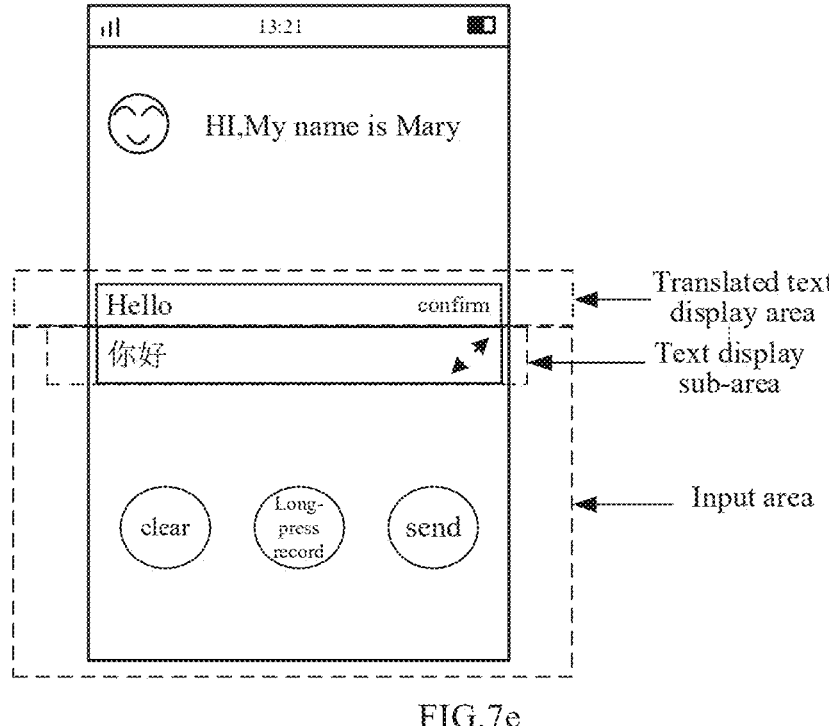
FIG. 7e is a schematic diagram of a scenario of conversation translation provided in another embodiment of the present specification.

FIG. 7e is a schematic diagram of a scenario of conversation translation provided in another embodiment of the present specification, as shown in FIG. 7e, in one scenario, taking a collaborative office software on a mobile phone as an example, the user can input a conversation message in voice form through a voice input control in an instant messaging application integrated with the collaborative office software, and when the user inputs the conversation message in voice form, the instant messaging application can translate the conversation message in voice form input by the user into a language used by a conversation partner in real time, and display the translated text in the translated text display area. In FIG. 7e, taking the language used by a conversation partner being English as an example for illustration. When the conversation message input by the user is a voice message, the voice message can be first converted into a corresponding input text for display, and the translated text obtained by translating the input text can be displayed synchronously. As mentioned above, in FIG. 7e, the text formats corresponding to the translated text and the input text are the same, which may be the default format of the conversation, or the format pre-configured by the user in the conversation.

It can be seen that in this embodiment, when the user inputs the conversation message through a plain text box, a rich text box, a voice input control, etc., the conversation message can be translated in real time, thereby meeting the conversation translation needs in different scenarios.

In an embodiment, the text formats of various text contents in the input text are consistent. As shown in FIG. 7a, the text formats of various text contents in the input text are consistent with each other, each is No. 4 Song font. In another embodiment, the text formats of various text contents in the input text may be different. With reference to FIG. 7c, the text format of a first line of text in the input text is No. 4 Song font, the text format of a second line of text in the input text is bold No. 4 Song font, the text format of a third line of text in the input text is italic No. 4 Song font, and the text format of a fourth line of text in the input text is underlined No. 4 Song font. In both cases, as shown in FIG. 7a and FIG. 7c, by means of the method in the present embodiment, it can be ensured that the second text format of the translated text is the same as the first text format of the input text.

In an embodiment, the conversation interface has an input area and a translated text display area. The input area has a text display sub-area which is used to display the input text, and the translated text display area is used to display the translated text, the input area and the translated text display area are arranged side by side in a vertical direction.

Taking FIG. 7a as an example, FIG. 7a illustrates the translated text display area and the input area, the translated text display area and the input area are arranged side by side in a vertical direction, the input area also has a text display sub-area, in a scenario where the user inputs text, the text display sub-area is used to display the text input by the user in real time, and the translated text display area is used to display the translated text in real time.

Taking FIG. 7e as an example, FIG. 7e illustrates the translated text display area and the input area, the translated text display area and the input area are arranged side by side in a vertical direction, the input area also has a text display sub-area, in a scenario where the user inputs audio data, the text display sub-area is used to display input text corresponding to the audio data input by the user in real time, and the translated text display area is used to display the translated text in real time.

In an embodiment, after the translated text is displayed in the translated text display area on the conversation interface, in response to a user confirmation operation on the translated text, the translated text or audio data corresponding to the translated text may be sent to the conversation. As shown in FIGS. 7a to 7e, the user can confirm the translated text by clicking a confirmation key, so that the translated text confirmed by the user or the audio data corresponding to the translated text after the confirmation can be sent to the conversation.

In another embodiment, after the translated text is displayed in the translated text display area on the conversation interface, in response to a processing operation by the user on the input text, the translated text may also be synchronously processed. Among them, the processing operation may include at least one of a scroll-browsing operation, a text editing operation, a format modification operation, a text selection operation, and a cursor movement operation.

Specifically, the user can perform the scroll-browsing operation on the input text, and the translated text can be scroll-browsed synchronously. The user can perform the text editing operation on the input text, and the translated text can be edited synchronously, and the translation of the input text edited by the user can be reflected in the edited translated text. The user can perform the format modification operation on the input text, and the format of the translated text can be modified synchronously, so that the text format of the input text and the text format of the translated text remain the same. The user can perform the text selection operation on the input text, and the corresponding translated text can be selected simultaneously. The user can perform the cursor movement operation on the input text, and the cursor can move in the translated text synchronously.

It can be seen that through the embodiment, the translated text can be processed synchronously when the user processes the input text, so that the user can achieve the effect of modifying the translated text by modifying the original.

In the embodiment, in response to the user's confirmation operation on the translated text processed synchronously, the translated text processed synchronously or the audio data corresponding to the translated text processed synchronously may be sent to the conversation. Based on this, FIG. 8 is a schematic flow chart of a conversation translation method provided by another embodiment of the present disclosure. As shown in FIG. 8, the flow includes the following steps:

Step S302, according to an input operation of a user in a conversation interface, displaying corresponding input text in an input area on the conversation interface, wherein the input text is of a first text format;

Step S304, acquiring a translated text of the input text, wherein the translated text is of a second text format; the second text format of the translated text is consistent with the first text format of the input text;

Step S306, displaying the translated text in a translated text display area on the conversation interface;

Step S308, in response to a confirmation operation by the user on the translated text, sending the translated text or the voice data corresponding to the translated text to the conversation;

Step S310, in response to a processing operation by the user on the input text, synchronously processing the translated text;

Step S312: in response to a confirmation operation by the user on the processed translated text, sending the processed translated text or the voice data corresponding to the processed translated text to the conversation.

Specifically, after the translated text is displayed, in a situation, if the user does not modify the input text, then step S308 is executed to receive a confirmation operation by the user on the translated text, and send the translated text or the voice data corresponding to the translated text to the conversation. In another situation, if the user modifies the input text, then steps S310 and S312 are executed to receive a processing operation by the user on the input text, and perform a corresponding processing on the translated text, in turn, receive a confirmation operation by the user on the processed translated text, send the confirmed translated text or the voice data corresponding to the confirmed translated text to the conversation.

In an embodiment, in the above step S104, the acquiring the translated text of the input text specifically includes:

(b1) determining a conversation partner for the user in the conversation;

(b2) acquiring language information of the conversation partner;

(b3) acquire a translated text obtained by translating and formatting the input text according to the language information of the conversation partner.

In an embodiment, in action (b1), the determining the conversation partner for the user in the conversation specifically includes:

(b11) when the conversation is a single chat conversation, determining the user's conversation partner in the single chat conversation as the user's conversation partner;

(b12) When the conversation is a group chat conversation, determining a target message on which a user can perform a preset message response operation in the group chat conversation, and determining the sender of the target message as the user's conversation partner.

In action (b11), for the single chat conversation, the user's conversation partner in the single chat conversation is taken as the user's conversation partner, In action (b12), for the group chat conversation, a target message, on which a user can perform the preset message response operation in the group chat conversation, can be determined, and the sender of the target message can be taken as the user's conversation partner.

In an embodiment, the preset message response operation includes: a message reading operation and a message marking operation of marking a message as a to-be-replied message; the determining the target message on which a user can perform a preset message response operation in the group chat conversation, specifically includes:

If there is a to-be-replied message for the user in the group chat conversation that is marked according to the message marking operation, the to-be-replied message is determined as the target message; if there is no to-be-replied message for the user in the group chat conversation that is marked according to the message marking operation, a message in the group chat conversation read by the user can be determined as the target message according to the message reading operation;

Specifically, after the user performs a preset message response operation on group chat messages in a group chat conversation, it is judged whether there is a to-be-replied message for the user in the group chat conversation that is marked according to the message marking operation, if so, the to-be-replied message can be determined as the target message, if not, the message in the conversation read by the user can be determined as the target messages according to the message reading operation.

In an embodiment, the preset message response operation includes a message reading operation; the determining the target message on which a user performs a preset message response operation in the group chat conversation, specifically includes: determining the message in the group chat conversation read by the user as the target messages according to the message reading operation. That is, when the preset message response operation includes a message reading operation, the messages in the group chat conversation read by the user can be determined as target messages.

In an embodiment, the preset message response operation includes a message marking operation of marking a message as a to-be-replied message; the determining the target message on which a user can perform a preset message response operation in the group chat conversation, specifically includes: determining a to-be-replied message for the user that is marked in the group chat conversation as the target message according to the message marking operation. That is, when the preset message response operation includes a message marking operation, the to-be-replied message marked by the user in the group chat conversation is determined as the target message.

Taking into account a situation that a user may have read multiple messages in a group chat conversation, in the above process, the determining the message in the group chat conversation read by the user as the target messages according to the message reading operation may include: when there are multiple read messages, determining the last message read by the user determined according to the message reading operation as the target message. Thus, when the user does not mark a to-be-replied message and has read multiple messages, the last read message can be determined as the target message, and the sender of the target message can be further taken as the user's conversation partner in the group chat conversation.

It can be seen that in the embodiment, in a single chat conversation, the user's conversation partner can be determined. In a group chat conversation, the conversation partner can be determined based on user operations. The sender corresponding to the to-be-replied message marked by the user is most likely the conversation partner to which the user will reply, if the user does not mark any to-be-replied message, the sender corresponding to the message read by the user is most likely the conversation partner to which the user will reply, the conversation partner that is most likely to be replied by the user is used as the user's conversation partner in the group chat conversation, thereby accurately determining the user's conversation partner in the group chat scenario.

In the above action (b2), the language information of the conversation partner can be obtained. In an embodiment, the action specifically includes:

(b21) when the conversation is a single chat conversion, acquiring primary language information of the conversation partner as the language information of the conversation partner, or, taking the language information of the message meeting a preset conditions sent by the conversation partner in the single chat conversation as the language information corresponding to the conversation;

(b22) when the conversation is a group chat conversation, acquiring primary language information of the conversation partner as the language information of the conversation partner, or, determining the target message which is sent by the conversation partner in the group chat conversation and on which the user performs a preset message response operation, and taking the language information of the target message as the language information of the conversation partner.

In the single chat conversation, in a situation, after the conversation partner of the user is determined, the primary language information of the conversation partner may be acquired as the language information of the conversation partner. A machine learning model can be used to identify the language of a message being sent by a conversation partner. For example, a conversation message sent by a conversation partner in an instant messaging application can be input into a pre-trained machine learning model, and the machine learning model outputs the language information of the conversation message, the language information output by the machine learning model is used as a language label of the conversation message, in this way, the language labels of conversation messages sent by the conversation partner in a recent period of time (such as 3 months) can be made statistics to determine the primary language information of the conversation partner. Of course, if the conversation partner sets a label of primary language information for itself, the label can be directly acquired to determine the primary language information of the conversation partner. In turn, the primary language information of the conversation partner is used as the language information of the conversation partner.

In a single chat conversation, in another situation, the language information of the message meeting a preset condition sent by the conversation partner in the single chat conversation can be taken as the language information of the conversation partner. The message meeting the preset condition includes one or more of the following: the last message read by the user, and the to-be-replied message marked by the user. Specifically, in the single chat conversation between the user and the conversation partner, the conversation partner sends conversation messages, and the language information of the last message read by the user in the sent conversation messages is taken as the language information of the conversation partner, or the language information of the to-be-replied message marked by the user in the sent conversation messages is taken as the language information of the conversation partner. When the sent conversation messages include both the message read by the user and the to-be-replied message marked by the user, the language information of the last message read by the user, and the language information of the to-be-replied message marked by the user can be acquired, when such two language information are the same, the same language information is taken as the language information of the conversation partner, when such two language information are different, the language information of the to-be-replied message marked by the user is taken as the language information of the conversation partner.

In a group chat conversation, the primary language information of the conversation partner may be acquired as the language information of the conversation partner in the same manner as described above. Alternatively, the target message which is sent by the conversation partner in the group chat conversation and on which the user performs a preset message response operation can be determined, the process of determining the target message is the same as the process of determining the target message in the previous action (b12). Based on the previous process of determining the target message, it can be known that the target message is sent by the conversation partner. The language information of the target message is taken as the language information of the conversation partner. The language information of the target message can be identified through machine learning models.

It can be seen that through actions (b21) and (b22), the language information of the conversation partner can be obtained in different conversation scenarios. In an embodiment, in action (b3), the input text can be translated and formatted according to the language information of the conversation partner to obtain the translated text, which can be implemented by a pre-trained machine learning model. During training of the machine learning model, formatted text data and translations in the same format as the text data can be used as training data for training the parameters in the model. The trained model has the ability to translate text and keep formats of the original and translation the same. In another embodiment, in action (b3), the input text can be translated and formatted according to the language information of the conversation partner to obtain the translated text. Specifically, the input text can be translated through a pre-trained machine learning model, and the text output by the machine learning model can be formatted according to the format information of the first text format of the input text to obtain the translated text, since the translated text is obtained by formatting the text output by the machine learning model according to the format information of the first text format, the second text format of the translated text is the same as the first text format of the input text.

In summary, through the above conversation translation method, the input text of the user in the conversation can be translated in real time to obtain the translated text, and the text format of the translated text can be kept consistent with that of the input text, with the help of the format synchronization between the translated text and the input text, the user's expression intention can be better retained in the translated text, thereby improving the communication efficiency between users in cross-language communication scenarios and improving the users' collaborative office efficiency.

Figure 9:
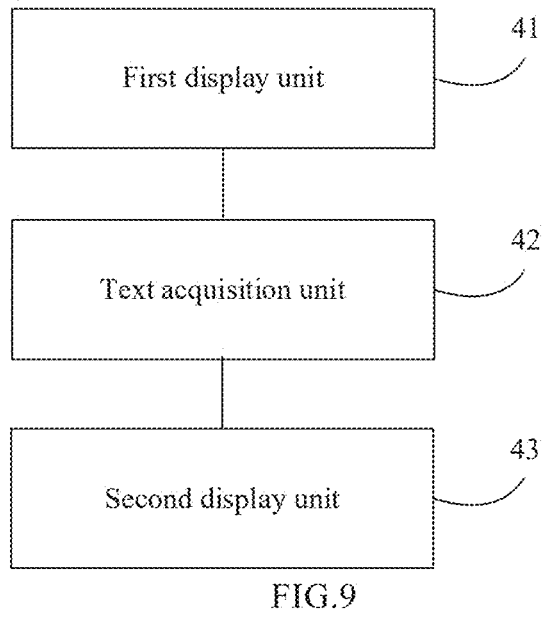
FIG. 9 is a schematic structural diagram of a conversation translation apparatus provided in an embodiment of the present specification.

FIG. 9 is a schematic structural diagram of a conversation translation apparatus provided in an embodiment of the present specification. As shown in FIG. 9, the apparatus includes:

a first display unit 41 configured to, according to an input operation of a user in a conversation interface, display corresponding input text in an input area on the conversation interface, wherein the input text is of a first text format;

a text acquisition unit 42 configured to acquire a translated text of the input text, wherein the translated text is of a second text format; the second text format of the translated text is consistent with the first text format of the input text;

a second display unit 43 configured to display the translated text in a translated text display area on the conversation interface.

Optionally, the text acquisition unit 42 is specifically configured to:

determine a conversation partner of the user in the conversation;

acquire language information of the conversation partner;

acquire the translated text that is obtained by translating and formatting the input text according to the language information of the conversation partner.

Optionally, the apparatus may further include a processing unit, configured to:

when the translated text is displayed in the translated text display area on the conversation interface, in response to a processing operation by the user on the input text, perform synchronous processing on the translated text.

Optionally, the apparatus may further include a sending unit, configured to:

when the translated text is displayed in the translated text display area on the conversation interface, in response to a confirmation operation by the user on the translated text, send the translated text or audio data corresponding to the translated text to the conversation.

Optionally, the first display unit 41 may be specifically configured to:

according to a text input operation by a user in a conversation interface, acquire the user's input text and display it in an input area on the conversation interface;

or, according to an audio input operation by the user in the conversation interface, acquire the audio data input by the user, perform a text conversion on the audio data to obtain the input text, and display the input text in the input area on the conversation interface.

Optionally, the apparatus may further include a formatting unit configured to:

after the audio data has been performed text conversion to obtain the input text, set the first text format of the input text as a default format of the conversation, or a format pre-configured by the user in the conversation.

Optionally, the text acquisition unit 42 may be further specifically configured to:

when the conversation is a single chat conversation, take a conversation partner of the user in the single chat conversation as the conversation partner of the user;

when the conversation is a group chat conversation, determine a target message on which the user performs a preset message response operation in the group chat conversation, and take a sender of the target message as a conversation partner of the user.

Optionally, the preset message response operation may include: a message reading operation and a message marking operation of marking a message as a to-be-replied message; and the text acquisition unit 42 may be further specifically configured to: if there is a to-be-replied message for the user in the group chat conversation that is marked according to the message marking operation, determine the to-be-replied message as the target message; if there is no to-be-replied message for the user in the group chat conversation that is marked according to the message marking operation, determine a message in the group chat conversation read by the user as the target message according to the message reading operation.

or, the preset message response operation may include a message reading operation; and the text acquisition unit 42 may be further specifically configured to:

determine a message in the group chat conversation read by the user as the target message according to the message reading operation;

or, the preset message response operation may include a message marking operation of marking a message as a to-be-replied message;

The text acquisition unit 42 may be further specifically configured to: determine a to-be-replied message for the user marked in the group chat conversation as the target message according to the message marking operation.

Optionally, the text acquisition unit 42 may be further specifically configured to:

when there are multiple read messages, determine the last message read by the user determined according to the message reading operation as the target message.

Optionally, the text acquisition unit 42 is further specifically configured to:

when the conversation is a single chat conversion, acquire primary language information of the conversation partner as the language information of the conversation partner, or, take the language information of the message meeting a preset condition sent by the conversation partner in the single chat conversation as the language information of the conversation partner;

when the conversation is a group chat conversation, acquire primary language information of the conversation partner as the language information of the conversation partner, or, determine the target message which is sent by the conversation partner in the group chat conversation and on which the user performs a preset message response operation, and take the language information of the target message as the language information of the conversation partner.

Optionally, the message meeting the preset condition may include one or more of the following:

the last message read by the user;

the to-be-replied message marked by the user.

It should be noted that the conversation translation apparatus in the embodiment can implement each process of the aforementioned embodiments of conversation translation method, and achieve the same effects and functions, which will not be repeated here.

Figure 10:
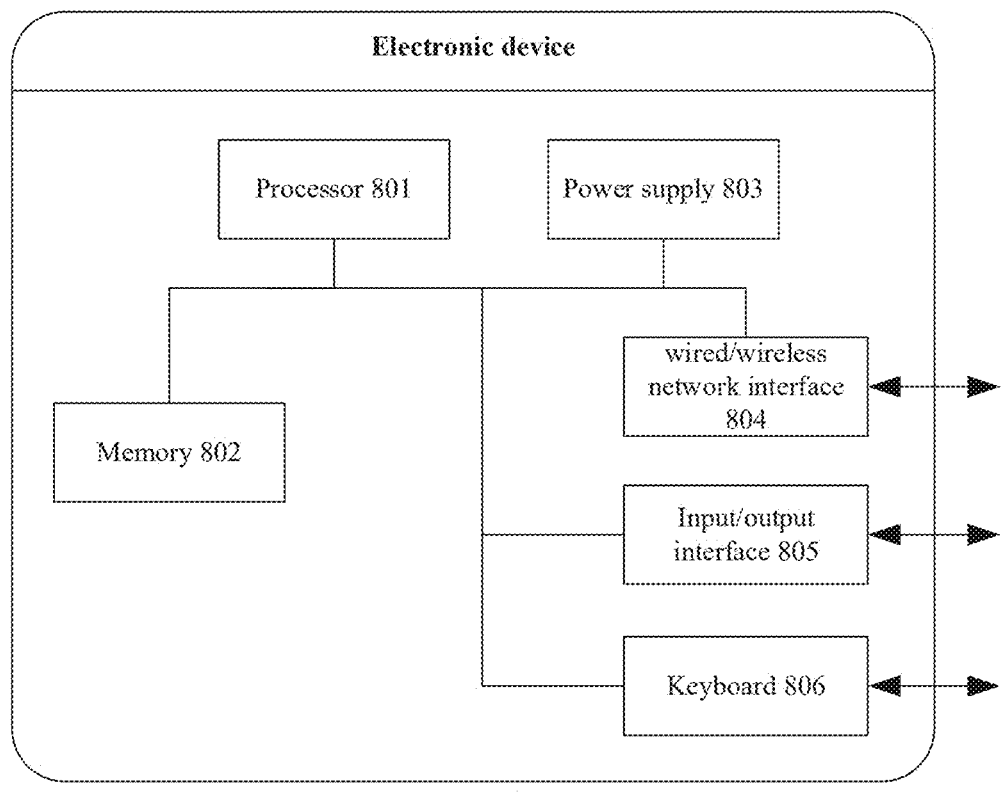
FIG. 10 is a schematic structural diagram of an electronic device provided in an embodiment of the present specification.

An electronic device is also provided in an embodiment of the present disclosure. FIG. 10 is a schematic structural diagram of the electronic device provided in an embodiment of the present disclosure. As shown in FIG. 10, the electronic device may exhibit relatively large differences due to different configurations or performances, and may include one or more processors 801 and memory 802. The memory 802 may store one or more application programs or data. Among them, the memory 802 can be temporary storage or permanent storage. The application program stored in the memory 802 may include one or more modules (not shown in the figure), and each module may include a series of computer-executable instructions in the electronic device. Furthermore, the processor 801 may be configured to communicate with the memory 802 to execute a series of computer executable instructions in the memory 802 on the electronic device. The electronic device may also include one or more power supplies 803, one or more wired or wireless network interfaces 804, one or more input or output interfaces 805, one or more keyboards 806, and the like.

In a specific embodiment, the electronic device includes a processor; and a memory configured to store computer executable instructions, wherein the computer executable instructions, when executed, cause the processor to implement the following process:

according to an input operation of a user in a conversation interface, displaying corresponding input text in an input area on the conversation interface, wherein the input text is of a first text format;

acquiring a translated text of the input text, wherein the translated text is of a second text format; the second text format of the translated text is consistent with the first text format of the input text; displaying the translated text in a translated text display area on the conversation interface.

It should be noted that the electronic device in the embodiment can implement the various processes of the aforementioned conversation translation method embodiments and achieve the same effects and functions, which will not be repeated here.

Another embodiment of the present disclosure further provides a computer-readable storage medium, which stores computer-executable instructions, and when the computer-executable instructions are executed by a processor, the following process is implemented:

according to an input operation of a user in a conversation interface, displaying corresponding input text in an input area on the conversation interface, wherein the input text is of a first text format;

acquiring a translated text of the input text, wherein the translated text is of a second text format; the second text format of the translated text is consistent with the first text format of the input text; displaying the translated text in a translated text display area on the conversation interface.

It should be noted that the storage medium in the embodiment can implement the various processes of the aforementioned conversation translation method embodiments and achieve the same effects and functions, which will not be repeated here.

The computer-readable storage medium includes a read-only memory (ROM), a random-access memory (RAM), a magnetic disk or an optical disk, etc.

In the 1990s, improvements to a technology could be clearly distinguished as hardware improvements (for example, improvements to circuit structures such as diodes, transistors, switches, etc.) or software improvements (improvements to method flows). However, with the development of technology, many current improvements to method flows can be regarded as direct improvements to hardware circuit structures. Designers almost always obtain the corresponding hardware circuit structure by programming the improved method flow into the hardware circuit. Therefore, it cannot be said that an improvement to a method flow cannot be achieved using hardware entity modules. For example, a programmable logic device (PLD) (such as a field programmable gate array (FPGA)) is such an integrated circuit that its logic function can be determined by user programming. Designers can "integrate" a digital system on a PLD by own programming, without needing to request a chip manufacturer to design and produce a dedicated integrated circuit chip. Moreover, nowadays, instead of manually producing integrated circuit chips, this kind of programming is mostly implemented with "logic compiler" software, which is similar to the software compiler used when developing and writing programs, the original codes before compilation can also be written in a specific programming language, which is referred to as hardware description language (HDL). There is not only one HDL, but many types of HDL, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), etc., the most commonly used ones are VHDL (Very-High-Speed Integrated Circuit Hardware Description Language) and Verilog. Those skilled in the art should also be aware that it is easy to obtain a hardware circuit that implements the logical method flow by simply performing logic programming on the method flow using the above-mentioned hardware description languages and programming it into an integrated circuit.

The controller can be implemented in any suitable manner. For example, the controller can take the form of a microprocessor or processor and a computer-readable medium storing computer-readable program codes (such as software or firmware) that can be executed by the (micro) processor, logic gates, switches, application specific integrated circuits (ASIC), programmable logic controllers, and embedded microcontrollers. Examples of controllers include but are not limited to the following microcontrollers: ARC 625D, Atmel AT91SAM, Microchip PIC18F26K20, and Silicone Labs C8051F320. The memory controller can also be implemented as a part of the control logic of the memory. Those skilled in the art also know that, in addition to implementing the controller in pure computer-readable program codes, it is entirely possible to implement the same function of the controller in the form of logic gates, switches, application-specific integrated circuits, programmable logic controllers, and embedded microcontrollers by logically programming the method steps. Therefore, such a controller can be regarded as a hardware component, and the devices included therein for realizing various functions can also be regarded as structures within the hardware component. Or even, the devices for realizing various functions may be regarded as both a software module for realizing the method and a structure within a hardware component.

The systems, apparatus, modules or units described in the above embodiments may be specifically implemented by computer chips or entities, or by products with certain functions. A typical implementation device is a computer. Specifically, the computer can be, for example, a personal computer, a laptop computer, a cellular phone, a camera phone, a smart phone, a personal digital assistant, a media player, a navigation device, an email device, a game console, a tablet computer, a wearable device, or a combination of any of these devices.

For the convenience of description, the above apparatuses can be described in various units divided according to their functions. Of course, when implementing the embodiments of the present specification, the functions of various units can be implemented in the same or multiple software and/or hardware.

Those skilled in the art should appreciate that one or more embodiments of the present specification may be provided as a method, a system or a computer program product. Therefore, one or more embodiments of the present specification may take the form of entirely hardware embodiments, entirely software embodiments, or embodiments combining software and hardware aspects. Furthermore, one or more embodiments of the present specification may take the form of a computer program product implemented on one or more computer-usable storage media (including but not limited to disk storage, CD-ROM, optical storage, etc.) containing computer-usable program codes.

The present specification is described with reference to flowcharts and/or block diagrams of methods, apparatus (systems), and computer program products according to embodiments of the specification. It should be understood that each process and/or block in the flowchart and/or block diagram, and a combination of the processes and/or blocks in the flowchart and/or block diagram can be implemented by computer program instructions. These computer program instructions can be provided to a processor of a general-purpose computer, a special-purpose computer, an embedded processor or other programmable data processing device to produce a machine, so that the instructions executed by the processor of the computer or other programmable data processing device produce a device for implementing the functions specified in one or more processes in the flowchart and/or one or more blocks in the block diagram.

These computer program instructions may also be stored in a computer-readable memory that can direct a computer or other programmable data processing device to work in a specific manner, so that the instructions stored in the computer-readable memory produce a product including an instruction device that implements the functions specified in one or more processes in the flowchart and/or one or more boxes in the block diagram.

These computer program instructions may also be loaded onto a computer or other programmable data processing device so that a series of operational steps can be executed on the computer or other programmable device to produce a computer-implemented process, whereby the instructions executed on the computer or other programmable device provide steps for implementing the functions specified in one or more processes in the flowchart and/or one or more boxes in the block diagram.

It shall be noted that the terms "comprise," "include," or any other variations thereof are intended to cover non-exclusive inclusion, such that a process, method, article, or apparatus that may include a list of elements includes not only those elements, but also other elements not expressly listed, or may also include elements inherent to such process, method, article, or apparatus. Without more limitations, an element defined by the phrase "comprising a . . . " does not exclude a case that there may exist other identical elements in the process, method, article or apparatus comprising the element.

One or more embodiments of the present specification may be described in the general context of computer-executable instructions executed by a computer, such as program modules. Generally, program modules include routines, programs, objects, components, data structures, etc. that perform particular tasks or implement particular abstract data types. One or more embodiments of the present description may also be practiced in distributed computing environments where tasks are performed by remote processing devices that are linked through a communications network. In a distributed computing environment, program modules may be located in both local and remote computer storage media including memories.

The various embodiments in the present specification are described in a progressive manner, the same or similar parts between the various embodiments can be referenced to each other, and each embodiment focuses on the differences from other embodiments. As for the system or apparatus disclosed in the embodiments, since they correspond to the methods disclosed in the embodiments, their descriptions are relatively simple, and the relevant parts can be referred to the description of the method part.

The above description merely relates to embodiments of the present disclosure and is not intended to limit the present disclosure. Various modifications and changes may be apparent to those skilled in the art. Any modifications, equivalent substitutions, improvements, etc. made within the spirit and principles of the present disclosure should be included in the scope of the claims of the present disclosure.

What is claimed is:

1. A method of translating and displaying messages, comprising:

in response to an original message being input in an input box, displaying a translated message corresponding to the original message in a translation area;

in response to a first preset operation of using translation, displaying the translated message in the input box, wherein the first preset operation comprises at least one of a trigger operation on a first control, a trigger operation on a shortcut key for usage of translation, or an operation of right-clicking to invoke a menu option and clicking on a usage-of-translation option in the menu option;

in response to a second preset operation of undoing the usage of the translation, displaying the original message in the input box and displaying the translated message in the translation area, wherein the second preset operation comprises at least one of a trigger operation on a second control, a triggering operation on a shortcut key for undoing the usage of the translation, or an operation of right-clicking to invoke a menu option and clicking an undo usage-of-translation option in the menu option;

displaying the first control in an input interface when the translated message corresponding to the original message is displayed in the translation area, wherein the first preset operation of using the translation serves as a triggering operation for the first control, or displaying the second control in the input interface when the translated message is displayed in the input box, wherein the second preset operation of undoing the usage of the translation serves as a triggering operation for the second control; and in response to the second preset operation of undoing the usage of the translation, displaying the first control in the input interface when the original message is displayed in the input box and the translated message is displayed in the translation area.

2. The method of claim 1, wherein the method further comprises:

when the input box displays the translated message and the second control is displayed in the input interface, in response to continuing to input in the input box, displaying the first control and not displaying the second control in the input interface.

3. The method of claim 1, wherein the method further comprises:

when the input box displays the translated message and the second control is displayed in the input interface, in response to triggering to send the translated message, displaying a third control and not displaying the second control in the input interface, wherein the third control is used to close the translation area.

4. The method of claim 1, wherein the method further comprises:

when the input box displays the translated message, the second control is displayed in the input interface, and there is no input within a preset duration, displaying a third control and not displaying the second control in the input interface, wherein the third control is used to close the translation area.

5. The method of claim 1, wherein the method further comprises:

displaying the first control in the input interface when an input operation is continuously triggered in the input box.

6. The method of claim 1, wherein the method comprises at least one of:

displaying the first control in the translation area; or displaying the second control in the translation area.

7. The method of claim 1, wherein the translated message includes multimedia resources, and the multimedia resources include at least one of pictures, videos, or links.

8. The method of claim 1, wherein the method further comprises:

in response to an operation of sending the translated message, sending the translated message to a conversation;

in response to re-editing triggered for the sent translated message, displaying all contents of the translated message in the input box.

9. An electronic device, comprising: a processor and a memory;

wherein the memory stores instructions or computer programs; wherein the instructions or computer programs in the memory, when executed by the processor, cause the electronic device to perform operations comprising:

in response to an original message being input in an input box, displaying a translated message corresponding to the original message in a translation area;

in response to a first preset operation of using translation, displaying the translated message in the input box, wherein the first preset operation comprises at least one of a trigger operation on a first control, a trigger operation on a shortcut key for usage of translation, or an operation of right-clicking to invoke a menu option and clicking on a usage-of-translation option in the menu option;

in response to a second preset operation of undoing the usage of the translation, displaying the original message in the input box and displaying the translated message in the translation area, wherein the second preset operation comprises at least one of a trigger operation on a second control, a triggering operation on a shortcut key for undoing the usage of the translation, or an operation of right-clicking to invoke a menu option and clicking an undo usage-of-translation option in the menu option;

displaying the first control in an input interface when the translated message corresponding to the original message is displayed in the translation area, wherein the first preset operation of using the translation serves as a triggering operation for the first control, or displaying the second control in the input interface when the translated message is displayed in the input box, wherein the second preset operation of undoing the usage of the translation serves as a triggering operation for the second control; and in response to the second preset operation of undoing the usage of the translation, displaying the first control in the input interface when the original message is displayed in the input box and the translated message is displayed in the translation area.

10. A non-transitory computer-readable storage medium, wherein instructions are stored in the computer-readable storage medium, and the instructions, when executed on a computing device, cause the computing device to perform operations comprising:

in response to an original message being input in an input box, displaying a translated message corresponding to the original message in a translation area;

in response to a first preset operation of using translation, displaying the translated message in the input box, wherein the first preset operation comprises at least one of a trigger operation on a first control, a trigger operation on a shortcut key for usage of translation, or an operation of right-clicking to invoke a menu option and clicking on a usage-of-translation option in the menu option;

in response to a second preset operation of undoing the usage of the translation, displaying the original message in the input box and displaying the translated message in the translation area, wherein the second preset operation comprises at least one of a trigger operation on a second control, a triggering operation on a shortcut key for undoing the usage of the translation, or an operation of right-clicking to invoke a menu option and clicking an undo usage-of-translation option in the menu option;

displaying the first control in an input interface when the translated message corresponding to the original message is displayed in the translation area, wherein the first preset operation of using the translation serves as a triggering operation for the first control, or displaying the second control in the input interface when the translated message is displayed in the input box, wherein the second preset operation of undoing the usage of the translation serves as a triggering operation for the second control; and in response to the second preset operation of undoing the usage of the translation, displaying the first control in the input interface when the original message is displayed in the input box and the translated message is displayed in the translation area.

11. The electronic device of claim 9, wherein the operations further comprise:

when the input box displays the translated message and the second control is displayed in the input interface, in response to continuing to input in the input box, displaying the first control and not displaying the second control in the input interface.

12. The electronic device of claim 9, wherein the operations further comprise:

when the input box displays the translated message and the second control is displayed in the input interface, in response to triggering to send the translated message, displaying a third control and not displaying the second control in the input interface, wherein the third control is used to close the translation area.

13. The electronic device of claim 9, wherein the operations further comprise:

when the input box displays the translated message, the second control is displayed in the input interface, and there is no input within a preset duration, displaying a third control and not displaying the second control in the input interface, wherein the third control is used to close the translation area.

14. The electronic device of claim 9, wherein the operations further comprise:

displaying the first control in the input interface when an input operation is continuously triggered in the input box.

15. The non-transitory computer-readable storage medium of claim 10, wherein the operations further comprise:

when the input box displays the translated message and the second control is displayed in the input interface, in response to continuing to input in the input box, displaying the first control and not displaying the second control in the input interface.

16. The non-transitory computer-readable storage medium of claim 10, wherein the operations further comprise:

when the input box displays the translated message and the second control is displayed in the input interface, in response to triggering to send the translated message, displaying a third control and not displaying the second control in the input interface, wherein the third control is used to close the translation area.

17. The non-transitory computer-readable storage medium of claim 10, wherein the operations further comprise:

when the input box displays the translated message, the second control is displayed in the input interface, and there is no input within a preset duration, displaying a third control and not displaying the second control in the input interface, wherein the third control is used to close the translation area.

18. The electronic device of claim 9, wherein the translated message includes multimedia resources, and the multimedia resources include at least one of pictures, videos, or links.

19. The electronic device of claim 9, the operations further comprising:

in response to an operation of sending the translated message, sending the translated message to a conversation; and in response to re-editing triggered for the sent translated message, displaying all contents of the translated message in the input box.

20. The non-transitory computer-readable storage medium of claim 10, wherein the translated message includes multimedia resources, wherein the multimedia resources include at least one of pictures, videos, or links, and wherein the operations further comprise:

in response to an operation of sending the translated message, sending the translated message to a conversation; and in response to re-editing triggered for the sent translated message, displaying all contents of the translated message in the input box.

\* \* \* \* \*